(12) United States Patent
Wang et al.

(10) Patent No.: US 12,412,895 B1
(45) Date of Patent: Sep. 9, 2025

(54) METHOD FOR PREPARING COBALT-FREE LAYERED CATHODE MATERIAL BY $Li^+/H^+$ EXCHANGE

(71) Applicant: NINGXIA UNIVERSITY, Ningxia (CN)

(72) Inventors: Hailong Wang, Ningxia (CN); Jia Yang, Ningxia (CN)

(73) Assignee: NINGXIA UNIVERSITY, Ningxia (CN)

( * ) Notice: Subject to any disclaimer, the term of this patent is extended or adjusted under 35 U.S.C. 154(b) by 0 days.

(21) Appl. No.: 19/044,884

(22) Filed: Feb. 4, 2025

Related U.S. Application Data

(63) Continuation of application No. PCT/CN2024/139007, filed on Dec. 13, 2024.

(30) Foreign Application Priority Data

Mar. 7, 2024 (CN) .................. 202410263401.X

(51) Int. Cl.
*H01M 4/525* (2010.01)
*C01G 53/44* (2025.01)

(52) U.S. Cl.
CPC ............ *H01M 4/525* (2013.01); *C01G 53/44* (2013.01); *C01P 2002/50* (2013.01); *C01P 2002/72* (2013.01); *C01P 2004/03* (2013.01); *C01P 2006/40* (2013.01)

(58) Field of Classification Search
None
See application file for complete search history.

(56) References Cited

U.S. PATENT DOCUMENTS

| | | | |
|---|---|---|---|
| 2013/0202966 A1* | 8/2013 | Yu ........................ | C01G 53/50 429/223 |
| 2017/0133672 A1* | 5/2017 | Song ................ | H01M 10/0525 |

FOREIGN PATENT DOCUMENTS

| | | | | |
|---|---|---|---|---|
| CN | 103247780 A | | 8/2013 | |
| CN | 114180646 A | * | 3/2022 | ............. C01G 53/82 |
| CN | 114566626 A | * | 5/2022 | ........... H01M 10/052 |
| CN | 117342624 A | * | 1/2024 | ............. C01G 53/82 |

OTHER PUBLICATIONS

CNIPA, Office Action, Application No. 202410263401.X, Aug. 30, 2024.
Pham et al: "Correlating the initial gas evolution and structural changes to cycling performance of Co-free Li-rich layered oxide cathode", Journal of Power Sources, vol. 527, 2022.

* cited by examiner

*Primary Examiner* — Tanisha Diggs
(74) *Attorney, Agent, or Firm* — WCF IP

(57) ABSTRACT

Provided is a method for preparing a cobalt-free layered cathode material by $Li^+/H^+$ exchange, including adding a metal sulfate solution, a precipitant solution, and a complexing agent solution dropwise into an aqueous ammonia solution to obtain a mixed solution, and subjecting the mixed solution to precipitation complexation to obtain a hydroxide precursor; and mixing the hydroxide precursor with a lithium source to obtain a mixture, and subjecting the mixture to pre-sintering and crystallization in sequence to obtain the cobalt-free layered cathode material, a temperature for the pre-sintering being less than a temperature for the crystallization, where metal sulfates include at least two selected from the group consisting of non-cobalt transition metal sulfates.

8 Claims, 15 Drawing Sheets

METHOD FOR PREPARING COBALT-FREE LAYERED CATHODE MATERIAL BY $Li^+/H^+$ EXCHANGE

CROSS REFERENCE TO RELATED APPLICATION

The present application is a continuation-in-part of application of International Patent Application No. PCT/CN2024/139007, filed on Dec. 13, 2024, which claims priority to Chinese Patent Application No. CN202410263401.X filed with the China National Intellectual Property Administration (CNIPA) on Mar. 7, 2024 and entitled "METHOD FOR PREPARING COBALT-FREE LAYERED CATHODE MATERIAL BY $Li^+/H^+$ EXCHANGE". The disclosure of the two applications is incorporated herein by reference in their entirety.

TECHNICAL FIELD

The present disclosure belongs to the technical field of cathode materials, and particularly relates to a method for preparing a cobalt-free layered cathode material by $Li^+/H^+$ exchange.

BACKGROUND

Lithium nickel cobalt manganese oxide (NCM)-based cathode materials are widely used in electric vehicles and electronic portable devices because of a high specific capacity. However, due to the environmental issues of cobalt mining and the rising price of cobalt, people have begun to explore cobalt-free high-nickel layered cathode materials. Therefore, the synthesis of a high-nickel cobalt-free layered cathode material has attracted much attention and is of great importance.

The sintering synthesis of existing cobalt-free layered cathode materials has inherent complexity. $Ni^{2+}$ can be oxidized to a trivalent state in large quantities only after 750° C., and the $Ni(OH)_6$ octahedron decomposes to form broken (asymmetric) $(Ni^{2+})O_{6-x}$ octahedron and $H_2O$. With a high concentration of oxygen vacancies, $Li^+$ does not have time to embed into the oxygen vacancies, and then $Ni^{2+}$ moves from the unstable $(Ni^{2+})O_{6-x}$ octahedron to the Li layer, forming a serious Li/Ni mixed arrangement. Accordingly, it is necessary to sinter at a relatively high crystallization temperature (not less than 850° C.) in an oxygen atmosphere, causing Li/O loss. In addition, due to an influence of metastable intermediates on the diffusion of $Li^+$ and metal ions during the sintering synthesis, different degrees of internal pores in the particles may be caused. Moreover, the Li/O loss and uneven diffusion of $Li^+$ and metal ions can also cause different degrees of Li/Ni mixed arrangement, such that the overall secondary particles show poor $Li^+$ diffusion capacity, capacity performance, and cycle stability during the charge and discharge.

SUMMARY

An object of the present disclosure is to provide a method for preparing a cobalt-free layered cathode material by $Li^+/H^+$ exchange. In the present disclosure, the method could promote $Li^+/H^+$ exchange and form a desirable layered structure (showing $I_{(003)}/I_{(104)}$ greater than 1.2), thereby making the obtained cobalt-free layered cathode material have high charge and discharge capacity and excellent cycle stability.

To achieve the above object, the present disclosure provides the following technical solutions:

The present disclosure provides a method for preparing a cobalt-free layered cathode material by Li+/H+ exchange, including the following steps:

adding a metal sulfate solution, a precipitant solution, and a complexing agent solution dropwise into an aqueous ammonia solution to obtain a mixed solution, and subjecting the mixed solution to precipitation complexation to obtain a hydroxide precursor; and mixing the hydroxide precursor with a lithium source to obtain a mixture, and subjecting the mixture to pre-sintering and crystallization in sequence to obtain the cobalt-free layered cathode material, a temperature for the pre-sintering being less than a temperature for the crystallization, wherein metal sulfates comprise at least two selected from the group consisting of non-cobalt transition metal sulfates.

In some embodiments, the metal sulfates include one selected from the group consisting of a mixed salt of nickel sulfate and manganese sulfate, a mixed salt of the nickel sulfate, the manganese sulfate, and ferrous sulfate, and a mixed salt of the nickel sulfate, the manganese sulfate, and titanium sulfate.

In some embodiments, in the mixed salt of the nickel sulfate and the manganese sulfate, a molar ratio of $Ni^{2+}$ to $Mn^{2+}$ is in a range of 8-9.5:0.5-2;

in the mixed salt of the nickel sulfate, the manganese sulfate, and the ferrous sulfate, a molar ratio of $Ni^{2+}$, $Mn^{2+}$, and $Fe^{2+}$ is in a range of 8-9.5:0.45-1.95:0.05-0.5; and in the mixed salt of the nickel sulfate, the manganese sulfate, and the titanium sulfate, a molar ratio of $Ni^{2+}$, $Mn^{2+}$, and $Ti^{2+}$ is in a range of 8-9.5:0.45-1.95:0.05-0.5.

In some embodiments, the metal sulfate solution has a concentration of 1.8 mol/L to 2 mol/L;

a precipitant in the precipitant solution includes sodium hydroxide and/or potassium hydroxide, and the precipitant solution has a concentration of 4 mol/L to 6 mol/L;

a complexing agent in the complexing agent solution includes ammonium hydroxide, and the complexing agent solution has a concentration of 4 mol/L to 10 mol/L;

the aqueous ammonia solution has a concentration of 0.5 mol/L to 2 mol/L; and a volume ratio of the metal sulfate solution, the precipitant solution, the complexing agent solution, and the aqueous ammonia solution is in a range of 100-300:100-300:50-200:2590-2700.

In some embodiments, the metal sulfate solution is dropwise added at a speed of 0.4 mL/min to 0.8 mL/min; the precipitant solution is dropwise added at a speed of 0.4 mL/min to 0.8 mL/min; and the complexing agent solution is dropwise added at a speed of 0.2 mL/min to 0.4 mL/min.

In some embodiments, the precipitation complexation is conducted at a temperature of 50° C. to 60° C. for 20 h to 60 h.

In some embodiments, a molar ratio of the hydroxide precursor to the lithium source is in a range of 1:1.05-1.2.

In some embodiments, the pre-sintering is conducted at a temperature of 150° C. to 300° C. for 6 h to 10 h; and the pre-sintering is conducted in an oxygen atmosphere, an air atmosphere, or a vacuum atmosphere.

In some embodiments, the crystallization is conducted at a temperature of 810° C. to 850° C. for 12 h to 20 h; and the crystallization is conducted in an oxygen atmosphere.

The present disclosure provides a method for preparing a cobalt-free layered cathode material by Li$^+$/H$^+$ exchange, including the following steps: adding a metal sulfate solution, a precipitant solution, and a complexing agent solution dropwise into an aqueous ammonia solution to obtain a mixed solution, and subjecting the mixed solution to precipitation complexation to obtain a hydroxide precursor; and mixing the hydroxide precursor with a lithium source to obtain a mixture, and subjecting the mixture to pre-sintering and crystallization in sequence to obtain the cobalt-free layered cathode material, a temperature for the pre-sintering being less than a temperature for the crystallization; where metal sulfates include at least two selected from the group consisting of non-cobalt transition metal sulfates. In the present disclosure, under the joint action of the precipitant and the complexing agent, metal ions are simultaneously precipitated under the competition of complexing and precipitation complexing to achieve atomic-level mixing, thereby obtaining a hydroxide precursor. The hydroxide precursor is mixed with the lithium source, and then subjected to low-temperature pre-sintering to fully exchange H$^+$ of the hydroxide precursor M(OH)$_2$ with Li$^+$ of the lithium source to form a metastable intermediate, laying the foundation for forming a desirable cobalt-free layered structure. Crystallization is conducted at a relatively high crystallization temperature to form a desirable layered structure (showing $I_{(003)}/I_{(104)}$ greater than 1.2), making a finally obtained cobalt-free layered cathode material show advantages of high charge and discharge capacity and excellent cycle stability.

DETAILED DESCRIPTION OF THE EMBODIMENTS

Figure 1:
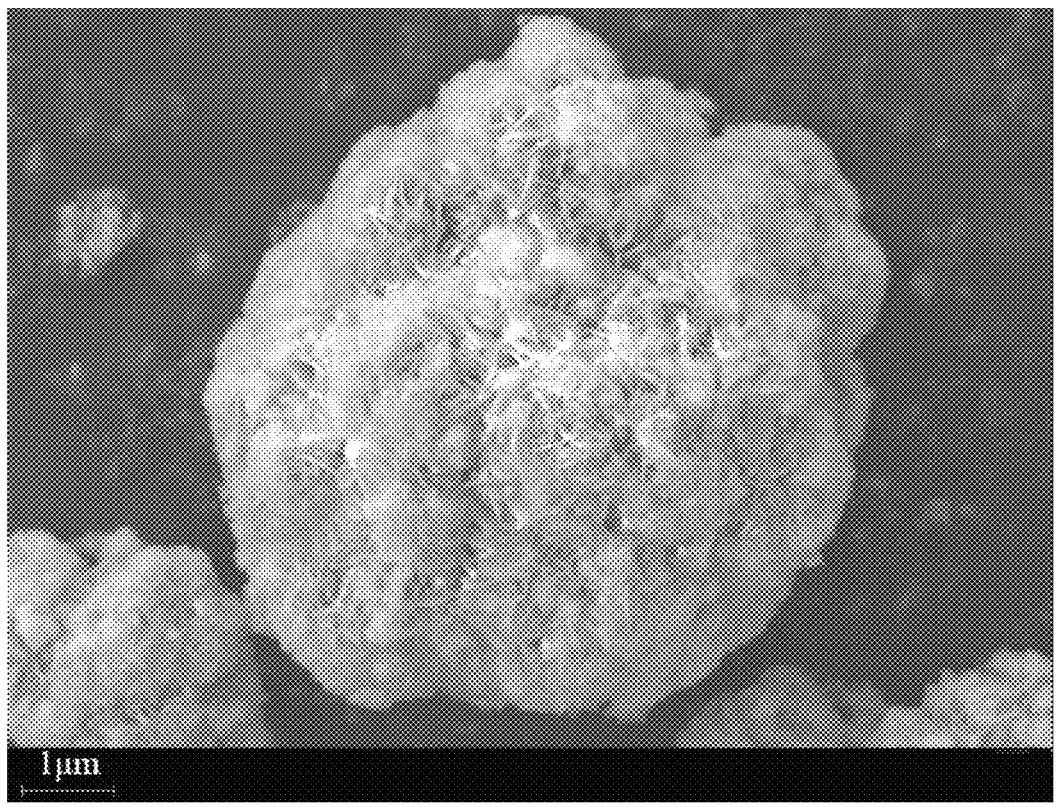
FIG. 1 shows a scanning electron microscopy (SEM) image of the NM precursor in Example 1.

The present disclosure provides a method for preparing a cobalt-free layered cathode material by Li$^+$/H$^+$ exchange, including the following steps:

adding a metal sulfate solution, a precipitant solution, and a complexing agent solution dropwise into an aqueous ammonia solution to obtain a mixed solution, and subjecting the mixed solution to precipitation complexation to obtain a hydroxide precursor; and mixing the hydroxide precursor with a lithium source to obtain a mixture, and subjecting the mixture to pre-sintering and crystallization in sequence to obtain the cobalt-free layered cathode material, a temperature for the pre-sintering being less than a temperature for the crystallization;

where metal sulfates include at least two selected from the group consisting of non-cobalt transition metal sulfates.

In the present disclosure, unless otherwise specified, all raw materials are commercially available products well known to those skilled in the art.

In the present disclosure, a metal sulfate solution, a precipitant solution, and a complexing agent solution are added dropwise into an aqueous ammonia solution, and a resulting mixed solution is subjected to precipitation complexation to obtain a hydroxide precursor.

In the present disclosure, metal sulfates are at least two selected from the group consisting of non-cobalt transition metal sulfates. In some embodiments, the metal sulfates include a mixed salt of nickel sulfate and manganese sulfate, where in the mixed salt of the nickel sulfate and the manganese sulfate, a molar ratio of Ni$^{2+}$ to Mn$^{2+}$ is in a range of (8-9.5):(0.5-2).

In the present disclosure, in some embodiments, the metal sulfates include a mixed salt of the nickel sulfate, the manganese sulfate, and ferrous sulfate, where in the mixed salt of the nickel sulfate, the manganese sulfate, and the ferrous sulfate, a molar ratio of the Ni$^{2+}$, the Mn$^{2+}$, and Fe$^{2+}$ is in a range of (8-9.5):(0.45-1.95):(0.05-0.5).

In the present disclosure, in some embodiments, the metal sulfates include a mixed salt of the nickel sulfate, the manganese sulfate, and titanium sulfate, where in the mixed salt of the nickel sulfate, the manganese sulfate, and the titanium sulfate, a molar ratio of the Ni$^{2+}$, the Mn$^{2+}$, and Ti$^{2+}$ is in a range of (8-9.5):(0.45-1.95):(0.05-0.5).

In the present disclosure, in some embodiments, the metal sulfate solution has a concentration of 1.8 mol/L to 2 mol/L.

In the present disclosure, in some embodiments, a precipitant in the precipitant solution includes sodium hydroxide and/or potassium hydroxide. In some embodiments, the precipitant solution has a concentration of 4 mol/L to 6 mol/L.

In the present disclosure, in some embodiments, a complexing agent in the complexing agent solution includes ammonium hydroxide. In some embodiments, the complexing agent solution has a concentration of 4 mol/L to 10 mol/L.

In the present disclosure, in some embodiments, the aqueous ammonia solution has a concentration of 0.5 mol/L to 2 mol/L. In some embodiments, a volume ratio of the metal sulfate solution, the precipitant solution, the complexing agent solution, and the aqueous ammonia solution is in a range of (100-300):(100-300):(50-200):(2590-2900).

In the present disclosure, in some embodiments, the aqueous ammonia solution is preheated before the adding dropwise. In some embodiments, a preheating temperature is the same as a precipitation complexation temperature.

In the present disclosure, in some embodiments, the metal sulfate solution is added at a speed of 0.4 mL/min to 0.8 mL/min. In some embodiments, the precipitant solution is added at a speed of 0.4 mL/min to 0.8 mL/min. In some embodiments, the complexing agent solution is added at a speed of 0.2 mL/min to 0.4 mL/min.

In the present disclosure, in some embodiments, the adding dropwise is conducted in a nitrogen atmosphere by stirring. In some embodiments, the stirring is conducted at a speed of 700 rpm to 1,000 rpm. In some embodiments, a pH value is controlled in a range of 11.2 to 11.8 during the adding dropwise.

In the present disclosure, in some embodiments, the precipitation complexation is conducted at a temperature of 50° C. to 60° C. for 20 h to 60 h. In some embodiments, the precipitation complexation is conducted in a nitrogen atmosphere by stirring. In some embodiments, the stirring is conducted at a speed of 600 rpm to 800 rpm. In some embodiments, a pH value is controlled in a range of 11.2 to 11.8 during the precipitation complexation.

In the present disclosure, during the precipitation complexation, metal ions are simultaneously precipitated under the competition of complexation and precipitation complexation to achieve atomic-level mixing to obtain a hydroxide precursor. The process mainly includes two steps: crystal nucleation and crystal growth:

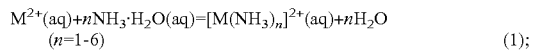

$$M^{2+}(aq)+nNH_3 \cdot H_2O(aq)=[M(NH_3)_n]^{2+}(aq)+nH_2O \quad (n=1\text{-}6) \quad (1);$$

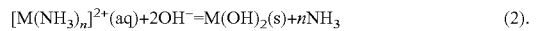

$$[M(NH_3)_n]^{2+}(aq)+2OH^-=M(OH)_2(s)+nNH_3 \quad (2).$$

In the present disclosure, in some embodiments, after the precipitate complexation is completed, a resulting system is subjected to filtration to collect a precipitate, and then, the precipitate is subjected to washing and drying in sequence. In some embodiments, the drying is conducted in an oven at a temperature of 80° C. to 100° C. for 12 h to 24 h.

In the present disclosure, in some embodiments, when the metal sulfates are the mixed salt of nickel sulfate and manganese sulfate, the hydroxide precursor has a chemical composition of $Ni_{0.8}Mn_{0.2}(OH)_2$; when the metal sulfates are the mixed salt of nickel sulfate, manganese sulfate, and ferrous sulfate, the hydroxide precursor has a chemical composition of $Ni_{0.8}Mn_{0.15}Fe_{0.05}(OH)_2$; when the metal sulfates are the mixed salt of nickel sulfate, manganese sulfate, and titanium sulfate, the hydroxide precursor has a chemical composition of $Ni_{0.8}Mn_{0.15}Ti_{0.05}(OH)_2$.

In the present disclosure, after the hydroxide precursor is obtained, the hydroxide precursor is mixed with a lithium source, and subjected to pre-sintering and crystallization in sequence to obtain the cobalt-free layered cathode material.

In the present disclosure, in some embodiments, the lithium source includes one or more selected from the group consisting of lithium hydroxide, lithium carbonate, lithium nitrate, and lithium sulfate. In some embodiments, a molar ratio of the hydroxide precursor to the lithium source is in a range of 1:1.05 to 1:1.2. In some embodiments, the mixing is conducted by grinding.

In the present disclosure, in some embodiments, the pre-sintering is conducted at a temperature of 150° C. to 300° C., preferably 230° C. to 250° C. In some embodiments, the pre-sintering is conducted for 6 h to 10 h. In some embodiments, the pre-sintering is conducted in an oxygen atmosphere, an air atmosphere, or a vacuum atmosphere.

In the present disclosure, the pre-sintering is conducted at a low temperature, and $Mn^{2+}/Fe^{2+}/Ti^{3+}$ are preferentially oxidized, such that the $Mn^{2+}(OH)_6/Fe^{2+}(OH)_6/Ti^{3+}(OH)_6$ octahedrons are transformed into $Mn^{4+}O_6/Fe^{3+}O_6/Ti^{4+}O_6$ octahedrons, and $H^+$ of the hydroxide precursor $M(OH)_2$ is fully exchanged with Li+ of the lithium source to form a metastable intermediate $(Ni^{2+})(OH)_{2-x}(Mn^{4+}/Fe^{3+}/Ti^{4+})(OLi)_x$, laying the foundation for forming a desirable cobalt-free layered structure.

In the present disclosure, after the pre-sintering is completed, a resulting system is subjected to the crystallization directly by raising a temperature of the system without cooling.

In the present disclosure, in some embodiments, the crystallization is conducted at a temperature of 810° C. to 850° C., preferably 820° C. to 830° C. In some embodiments, the crystallization is conducted for 12 h to 20 h. In some embodiments, the crystallization is conducted in an oxygen atmosphere.

In the present disclosure, in some embodiments, when the metal sulfates are the mixed salt of nickel sulfate and manganese sulfate, the pre-sintering is conducted at a temperature of 250° C. and the crystallization is conducted at a temperature of 850° C.; when the metal sulfates are the mixed salt of nickel sulfate, manganese sulfate, and ferrous sulfate, the pre-sintering is conducted at a temperature of 230° C. and the crystallization is conducted at a temperature of 810° C.; when the metal sulfates are the mixed salt of nickel sulfate, manganese sulfate, and titanium sulfate, the pre-sintering is conducted at a temperature of 250° C. and the crystallization is conducted at a temperature of 830° C.

In the present disclosure, the crystallization is conducted at a relatively high temperature, making it possible to form a desirable layered structure (showing $I_{(003)}/I_{(104)}$ greater than 1.2).

In the present disclosure, in some embodiments, when the metal sulfates are the mixed salt of nickel sulfate and manganese sulfate, the cobalt-free layered cathode material has a chemical composition of $LiNi_{0.8}Mn_{0.2}O_2$(NM); when the metal sulfates are the mixed salt of nickel sulfate, manganese sulfate, and ferrous sulfate, the cobalt-free layered cathode material has a chemical composition of $LiNi_{0.8}Mn_{0.15}Fe_{0.05}O_2$ (NMF); when the metal sulfates are the mixed salt of nickel sulfate, manganese sulfate, and titanium sulfate, the cobalt-free layered cathode material has a chemical composition of $LiNi_{0.8}Mn_{0.15}Ti_{0.05}O_2$ (NMT).

In the present disclosure, cobalt-free secondary particles of hydroxide are prepared by a co-precipitation method. The cobalt-free secondary particles of hydroxide are formed by agglomeration of nano-sheet-like primary particles, and has a crystal structure of a layer-liked P3̄m1, which is conducive to Li+ diffusion and Li+/H+ exchange during the sintering (i.e., the whole process of pre-sintering and crystallization). Second, the layer-liked structure of the hydroxide precursor would disintegrate into oxides with a spinel or rock salt structure at high temperature, which may block the Li+/H+ exchange; thus, in the present disclosure, the hydroxide precursor is mixed with a lithium source and pre-sintered at a low temperature to promote a rapid and uniform formation of cobalt-free layered material seed crystals in the particles, thereby helping the subsequent high-temperature crystallization of the particle block. Third, a large amount of $Ni(OH)_2$ can be decomposed into NiO with a rock salt structure under high oxygen concentration, causing the layer-liked P3̄m1 to collapse; thus, in the present disclosure, an oxygen atmosphere, an air atmosphere, or a vacuum atmosphere is adopted in the low-temperature pre-sintering stage. Fourth, after the low-temperature pre-sintering stage, the Li$^+$/H$^+$ exchange can be promoted, making the cobalt-free layered material possible to form a desirable layered structure at a high crystallization temperature and exhibit an excellent cycle performance.

In order to further illustrate the present disclosure, the method for preparing the cobalt-free layered cathode material by Li$^+$/H$^+$ exchange of the present disclosure will be described in detail below in conjunction with accompanying drawings and examples, but they should not be construed as limiting the scope of the present disclosure.

Example 1

Ammonia water and 2.5 L of pure water were mixed in a reactor and stirred to form a 1 mol/L aqueous ammonia solution as a base solution.

300 mL of 2 mol/L metal sulfate solution was prepared (NM: Ni$^{2+}$/Mn$^{2+}$=8/2, NMF: Ni$^{2+}$/Mn$^{2+}$/Fe$^{2+}$=8/1.5/0.5, NMT: Ni$^{2+}$/Mn$^{2+}$/Ti$^{3+}$=8/1.5/0.5). 300 mL of 5 mol/L NaOH solution was prepared as a precipitant solution. 200 mL of 10 mol/L ammonium hydroxide solution was prepared as a complexing agent solution.

The base solution was heated to 50° C., and nitrogen was introduced into the reactor.

The metal sulfate solution, the precipitant solution, and the complexing agent solution were pumped into the reactor at 0.4 mL/min, 0.4 mL/min, and 0.2 mL/min, respectively, using a high-precision peristaltic pump and stirred at 800 rpm. A pH value was maintained at 11.5 to 11.8 during feeding, and the feeding was continued for 15 h.

After the feeding, a reaction was conducted for 45 h while stirring at 700 rpm under a temperature of a mixed solution in the reactor of 50° C. and a pH value of 11.5 to 11.8. A resulting system was subjected to vacuum filteration to collect a precipitate, and the precipitate was washed and dried in an oven at 80° C. for 12 h to obtain a brown hydroxide precursor.

The hydroxide precursor and LiOH were mixed and ground evenly (a molar ratio of the hydroxide precursor to the LiOH was 1:1.05). A resulting mixture was pre-sintered at a pre-sintering temperature in an air atmosphere for 6 h (NM: 250° C., NMT: 250° C., and NMF: 230° C.), then heated to a crystallization temperature without annealing and subjected to crystallization for 12 h in an O$_2$ atmosphere (NM: 850° C., NMT: 830° C., and NMF: 810° C.), to obtain cathode materials NM, NMT, and NMF, respectively.

Example 2

Cathode materials NM, NMT, and NMF were prepared according to the method of Example 1, respectively, except that an atmosphere of the pre-sintering was adjusted to an oxygen atmosphere.

Example 3

Cathode materials NM, NMT, and NMF were prepared according to the method of Example 1, respectively, except that an atmosphere of the pre-sintering was adjusted to a vacuum atmosphere.

Example 4

Cathode materials NM, NMT, and NMF were prepared according to the method of Example 1, respectively, except that the LiOH was replaced by Li$_2$CO$_3$, and the pre-sintering of NM, NMT, and NMF all was conducted at 230° C. and the crystallization of NM, NMT, and NMF all was conducted at 810° C.

Comparative Example 1

Cathode materials NM, NMT, and NMF were prepared according to the method of Example 2, respectively, except that the pre-sintering was conducted at 500° C.

Comparative Example 2

Cathode materials NM, NMT, and NMF were prepared according to the method of Example 2, respectively, except that the pre-sintering was omitted.

Comparative Example 3

Cathode materials NM, NMT, and NMF were prepared according to the method of Example 4, respectively, except that the pre-sintering was conducted at 500° C., and both the pre-sintering and crystallization were conducted in an oxygen atmosphere.

Performance Testing

Test Example 1

Figure 2:
FIG. 2 shows a high-magnification local SEM image of the NM precursor in Example 1.
Figure 3:
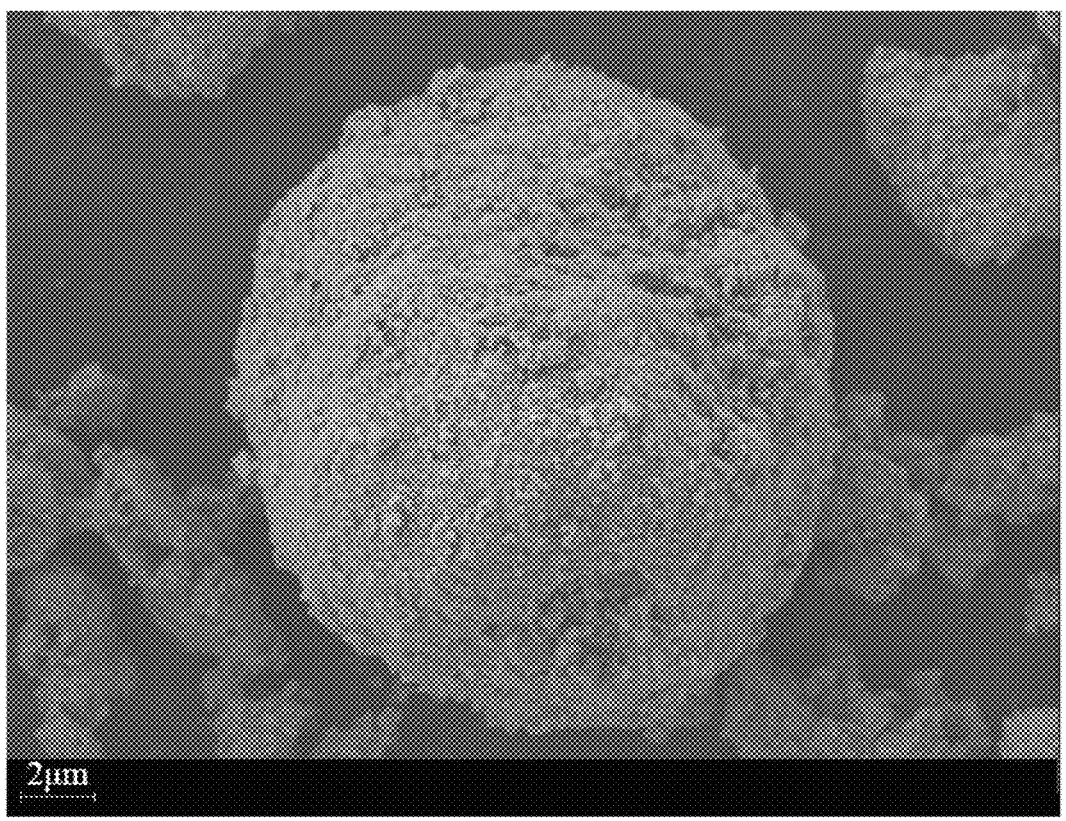
FIG. 3 shows a SEM image of the NM layered cathode material in Example 1.
Figure 4:
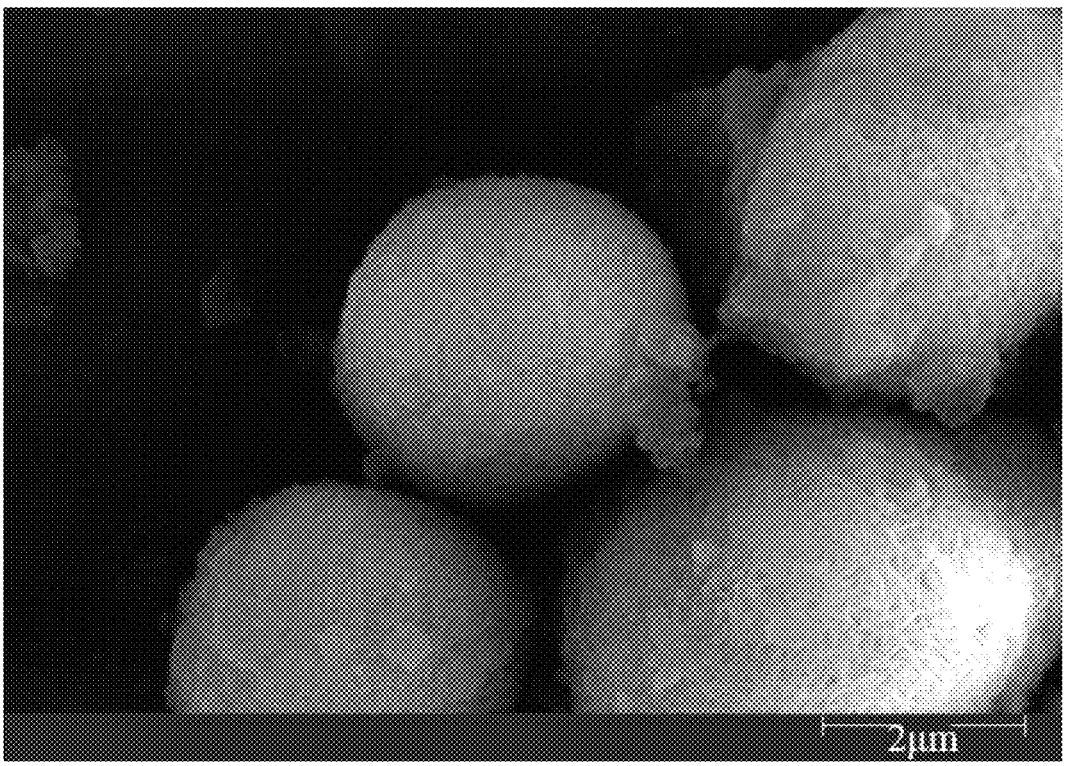
FIG. 4 shows a high-magnification local SEM image of the NMT precursor in Example 1.
Figure 5:
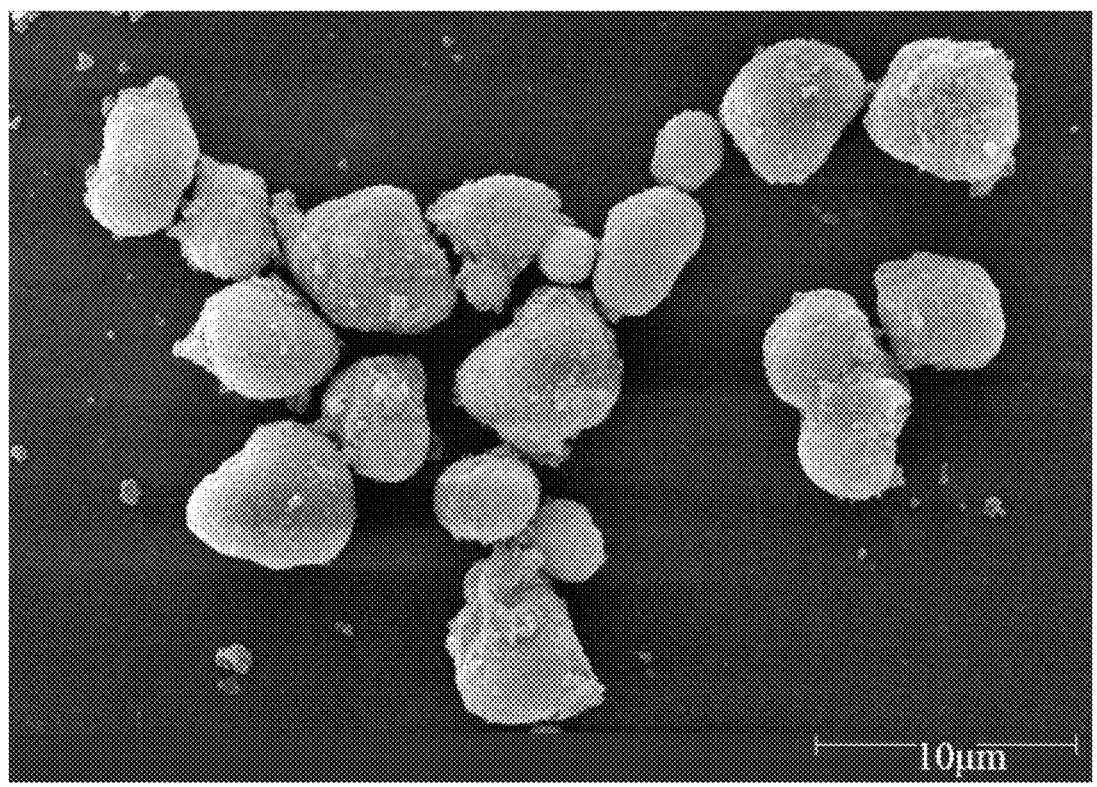
FIG. 5 shows a low-magnification wide SEM image of the NMT precursor in Example 1.
Figure 6:
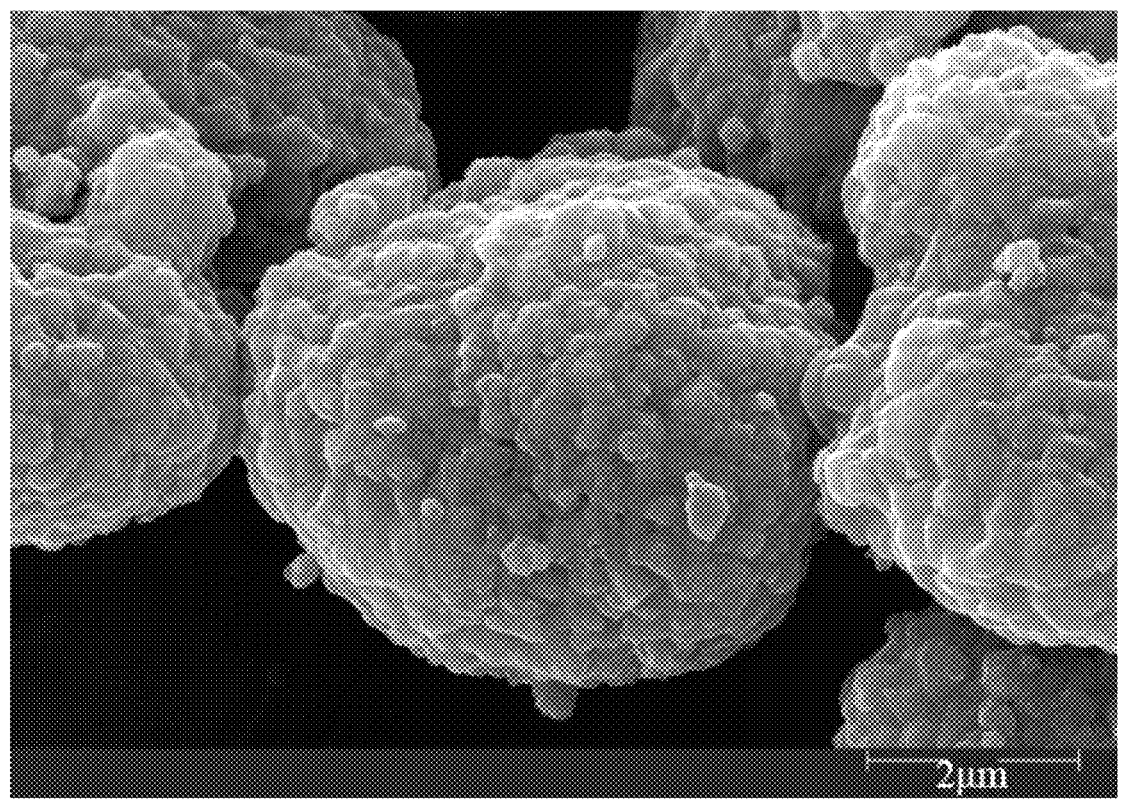
FIG. 6 shows a high-magnification local SEM image of the NMT layered cathode material in Example 1.
Figure 7:
FIG. 7 shows a low-magnification wide SEM image of the NMT layered cathode material in Example 1.

The cathode material obtained in Example 1 was subjected to SEM testing, and the obtained SEM test images are shown in FIG. 1 to FIG. 7. FIG. 1 shows a SEM image of the NM precursor. FIG. 2 shows a high-magnification local SEM image of the NM precursor. FIG. 3 shows a SEM image of the NM layered cathode material. FIG. 4 shows a high-magnification local SEM image of the NMT precursor. FIG. 5 shows a low-magnification wide SEM image of the NMT precursor. FIG. 6 shows a high-magnification local SEM image of the NMT layered cathode material. FIG. 7 shows a low-magnification wide SEM image of the NMT layered cathode material.

As shown in FIG. 1 to FIG. 7, the precursor of the cobalt-free layered cathode material is spherical secondary particles formed by the agglomeration of nano-sheet-like primary grains. After the precursor was mixed with a lithium source and sintered, the secondary particles still remain spherical secondary particles, and the primary particles are polyhedral. The particle size of the material is 4 μm to 10 μm, showing the particles in the material are uniform and dispersed.

Test Example 2

The cathode materials obtained in the examples and the comparative examples were subjected to XRD testing, and the obtained XRD patterns are shown in the figures.

Figure 8:
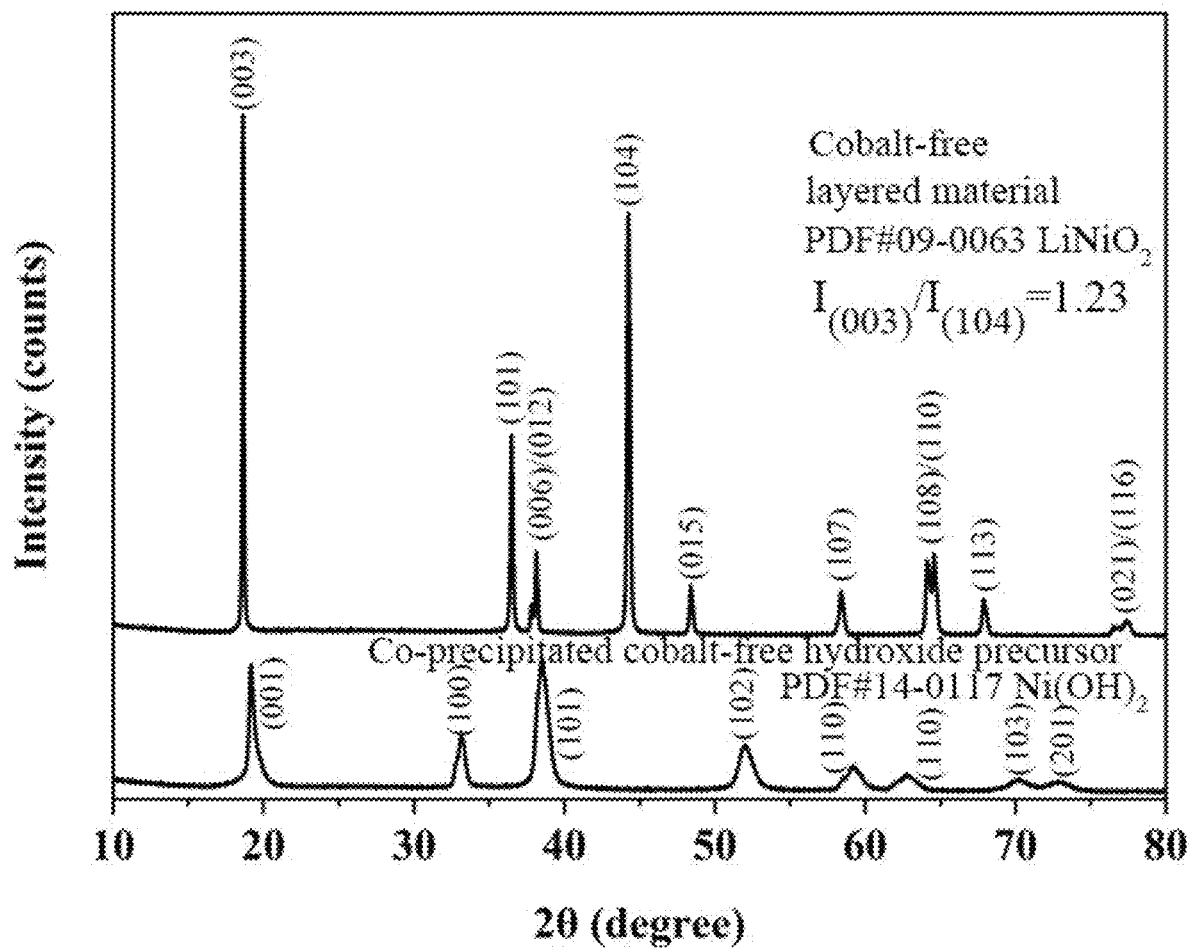
FIG. 8 shows X-ray diffraction (XRD) patterns of the NM precursor and the NM cathode material in Example 1.

FIG. 8 shows XRD patterns of the NM precursor and NM cathode material obtained in Example 1. FIG. 8 indicates that a cobalt-free precursor with a layer-liked P3̄m1 structure is prepared. The precursor was mixed with a certain proportion of the lithium source and then sintered appropriately to obtain an α-NaFeO$_2$-type R3̄m layered cobalt-free cathode material.

Figure 9:
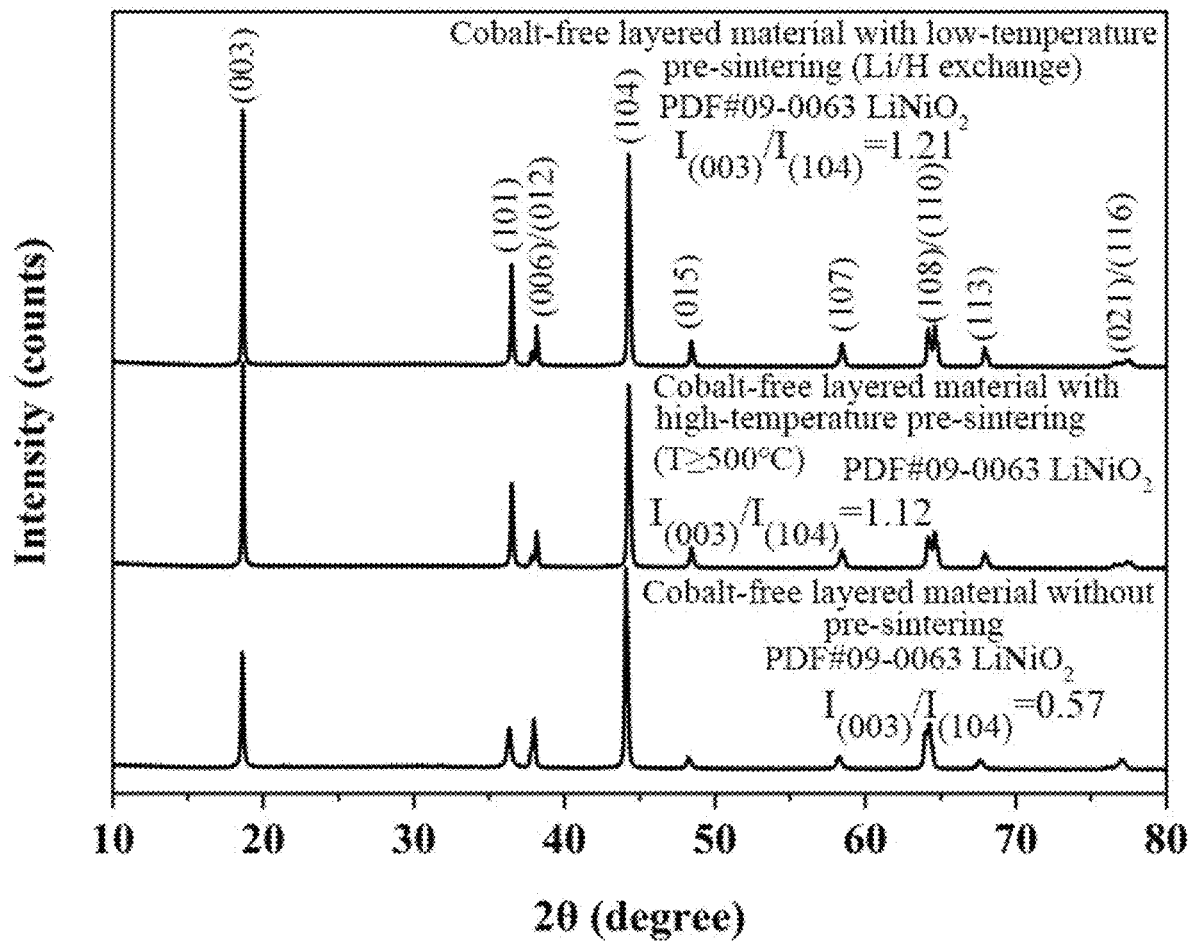
FIG. 9 shows XRD patterns of the NM cathode materials in Example 1, Comparative Example 1, and Comparative Example 2.

FIG. 9 shows XRD patterns of the NM cathode materials obtained in Example 1, Comparative Example 1, and Comparative Example 2, where "without pre-sintering" represents Comparative Example 2, "high-temperature pre-sintering" represents Comparative Example 1, and "low-temperature pre-sintering" represents Example 1. As shown in FIG. 9, under the same high-temperature sintering conditions, the (006)/(012) peak and (018)/(110) peak of the XRD diffraction peak of the cobalt-free cathode material without pre-sintering do not show obvious splitting, and an intensity ratio of the (003) peak to the (104) peak is only 0.57, which is much smaller than 1.2, indicating that a layered structure is not formed. The $I_{(003)}/I_{(104)}$ of the cobalt-free cathode material pre-sintered at high temperature is 1.12, which is smaller than 1.2, indicating that a desirable layered structure is not formed. The $I_{(003)}/I_{(104)}$ of the cobalt-free cathode material pre-sintered at low temperature is 1.21, which is greater than 1.2, indicating that compared with the first two cathode materials, a desirable cobalt-free layered cathode material has been prepared, owing to the fact that the low-temperature Li/H exchange promotes the formation of a layered structure.

Figure 10:
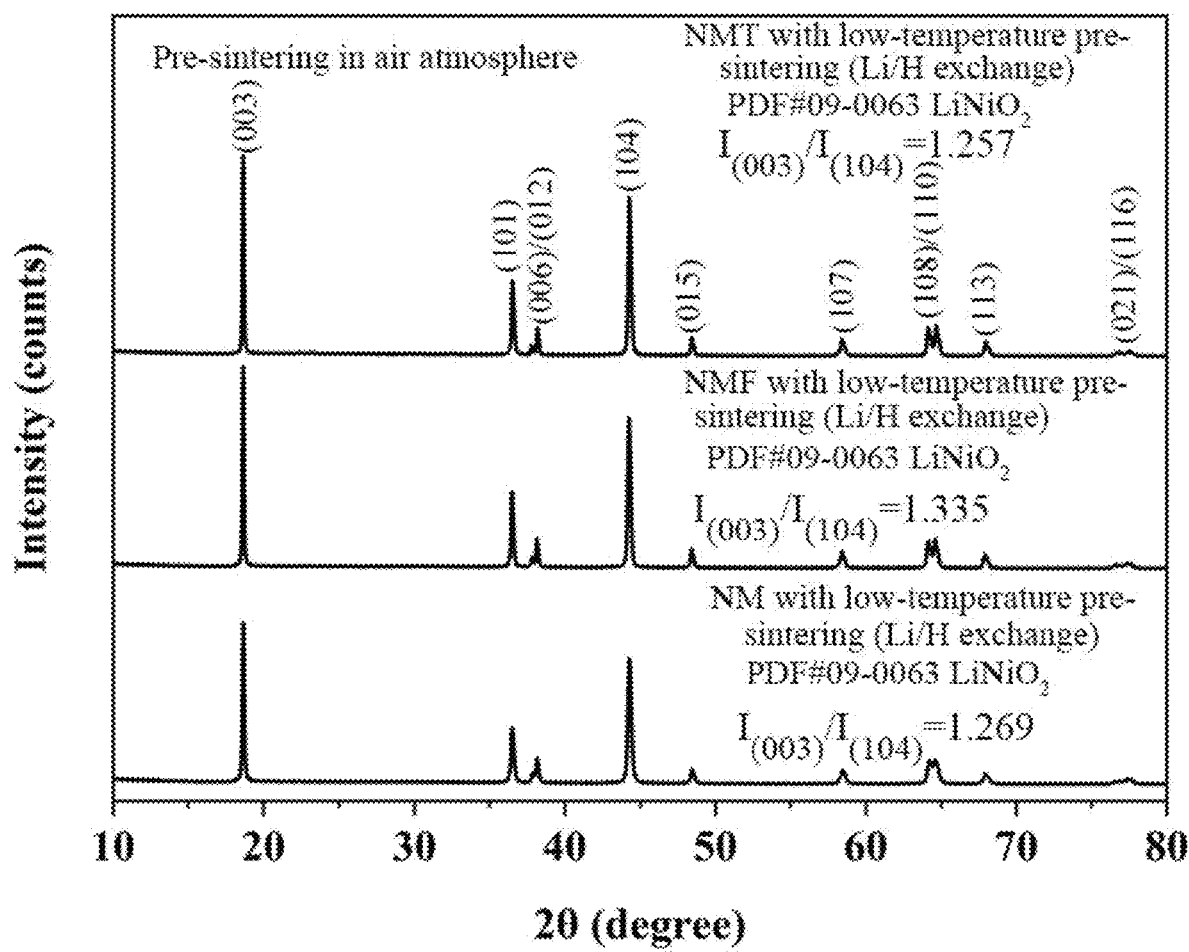
FIG. 10 shows XRD patterns of the NM, NMT, and NMF cathode materials in Example 1.
Figure 11:
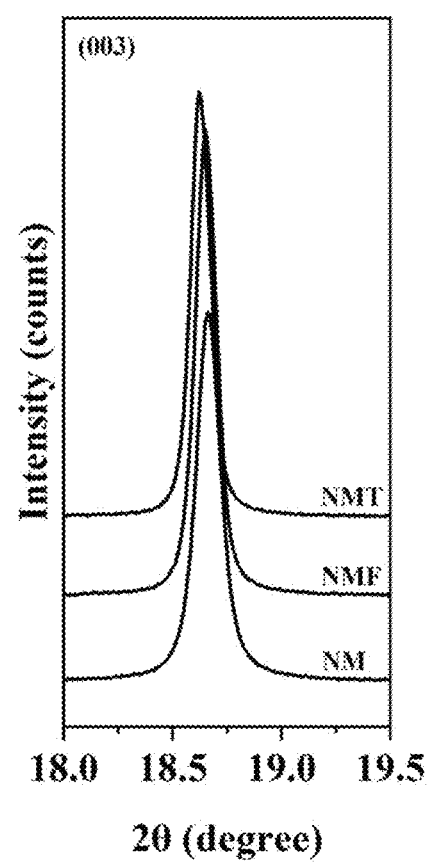
FIG. 11 shows a local view of the 003 peak in FIG. 10.

FIG. 10 shows XRD patterns of the NM, NMT, and NMF cathode materials in Example 1. FIG. 11 shows a local view of the 003 peak. As shown in FIG. 10 and FIG. 11, the low-temperature pre-sintering of NM, NMT, and NMF in air atmosphere inhibits the disintegration of the layer-liked structure of the hydroxide precursor and promotes the Li/H exchange to form a metastable intermediate that has been converted into a layered structure, which would further convert into a desirable layered structure ($I_{(003)}/I_{(104)}>1.2$) during the subsequent high-temperature thermal insulation, and the lattice parameters c of NM, NMF, and NMT increase successively.

Figure 13:
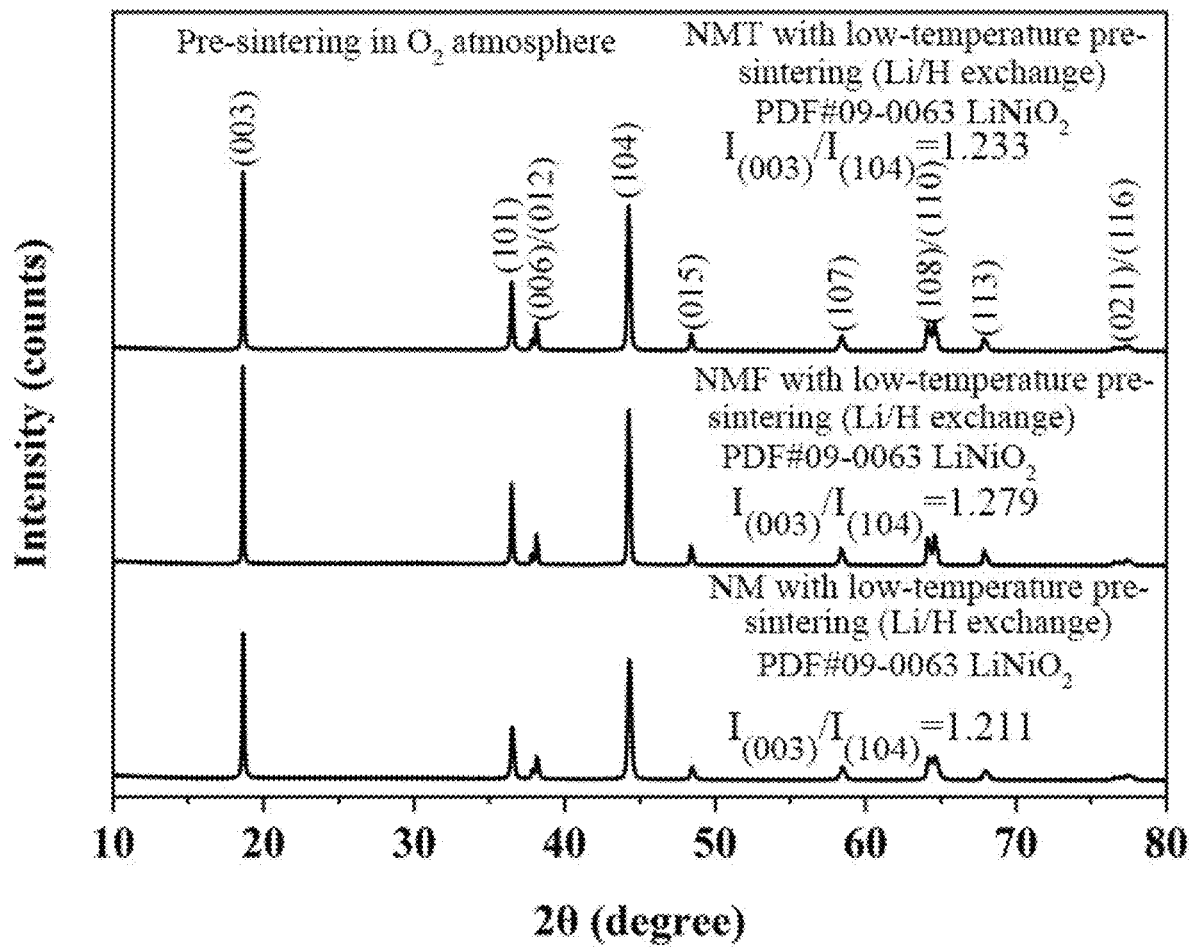
FIG. 13 shows XRD patterns of the NM, NMT and NMF cathode materials in Example 2.

FIG. 13 shows XRD patterns of the cathode materials NM, NMT and NMF obtained in Example 2. As shown in FIG. 13, NM, NMT and NMF are pre-sintered at low temperature in an oxygen atmosphere. During the Li/H exchange, the disintegration of the layered hydroxide precursor is accelerated in the oxygen atmosphere, such that the Li/H exchange is insufficient. Therefore, the layered structure finally formed has a higher degree of Li/Ni mixed arrangement than that in Example 1 (the $I_{(003)}/I_{(104)}$ is lower than that of Example 1).

Figure 14:
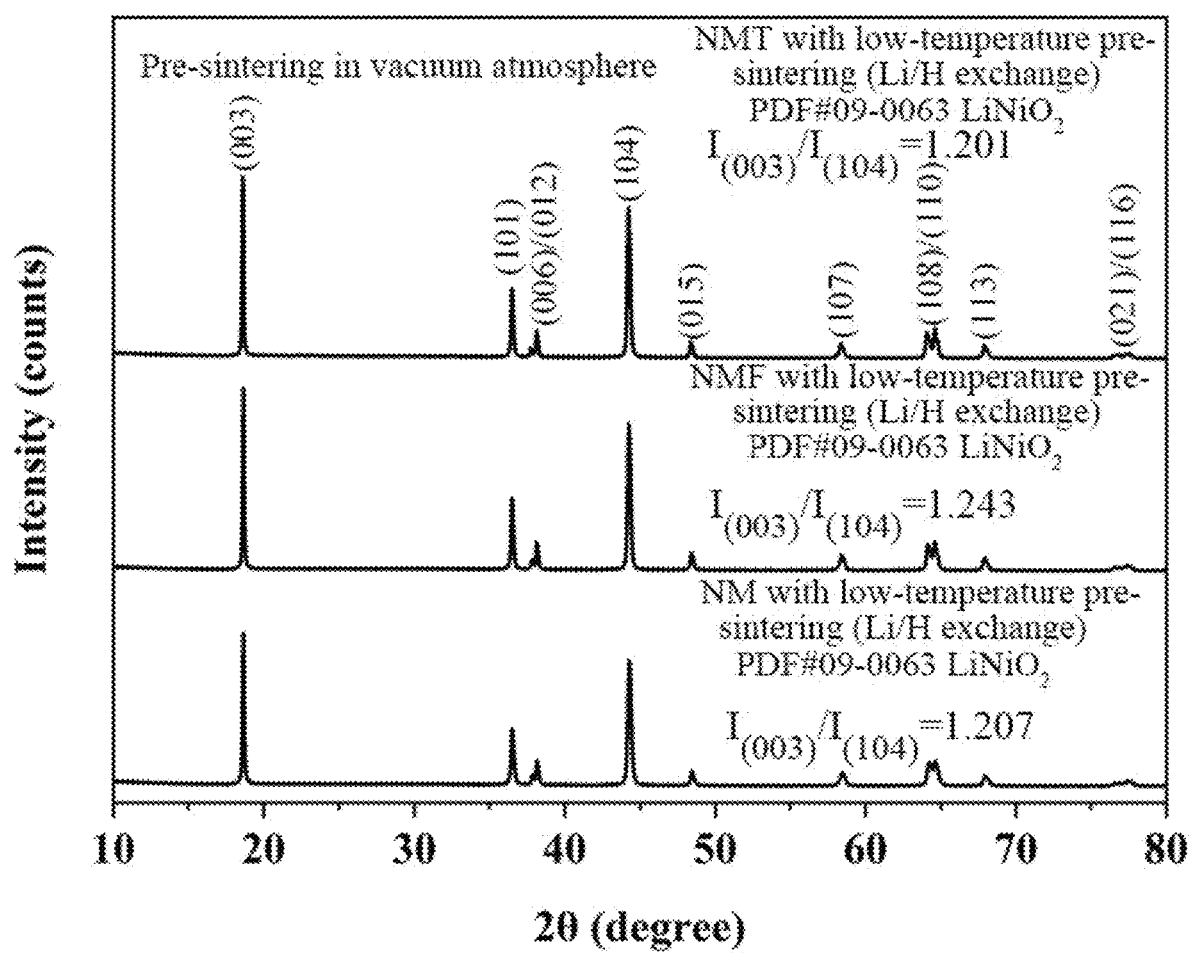
FIG. 14 shows XRD patterns of the NM, NMT and NMF cathode materials in Example 3.

FIG. 14 shows XRD patterns of the cathode materials NM, NMT and NMF obtained in Example 3. As shown in FIG. 14, NM, NMT and NMF are pre-sintered at low temperature in a vacuum atmosphere and then keep at high temperature to achieve the highest degree of Li/Ni mixed arrangement ($I_{(003)}/I_{(104)}$ is the lowest relative to that in Examples 1 and 2).

Figure 15:
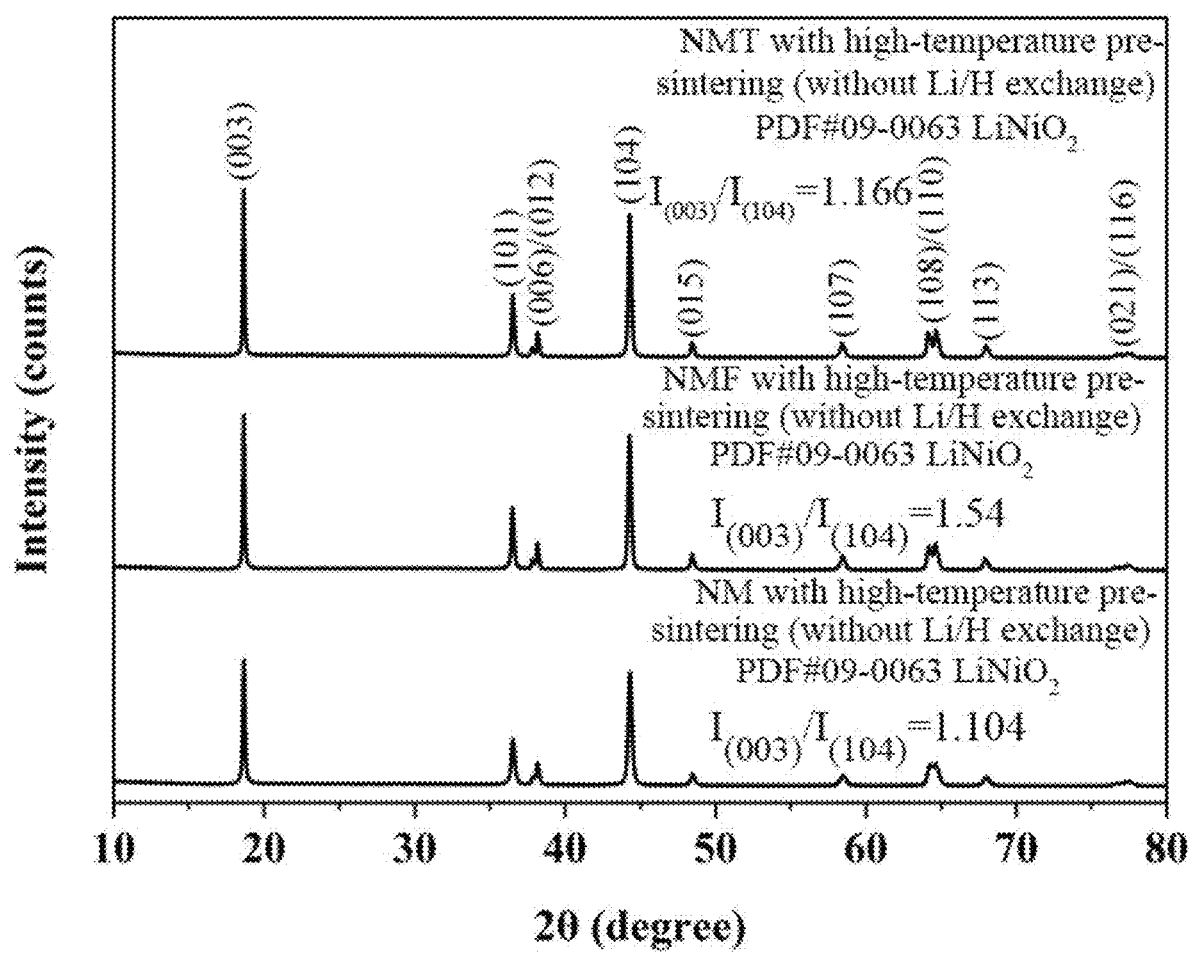
FIG. 15 shows XRD patterns of the NM, NMT, and NMF cathode materials in Comparative Example 1.

FIG. 15 shows XRD patterns of the cathode materials NM, NMT and NMF obtained in Comparative Example 1. As shown in FIG. 15, NM, NMT and NMF do not undergo Li/H exchange during high-temperature pre-sintering (500° C.) due to the rapid disintegration of the layered hydroxide precursor, and thus fail to form a metastable intermediate that could promote the transformation into a layered structure, resulting in the poor formation of a desirable layered structure ($I_{(003)}/I_{(104)}<1.2$) during the high-temperature sintering.

Figure 16:
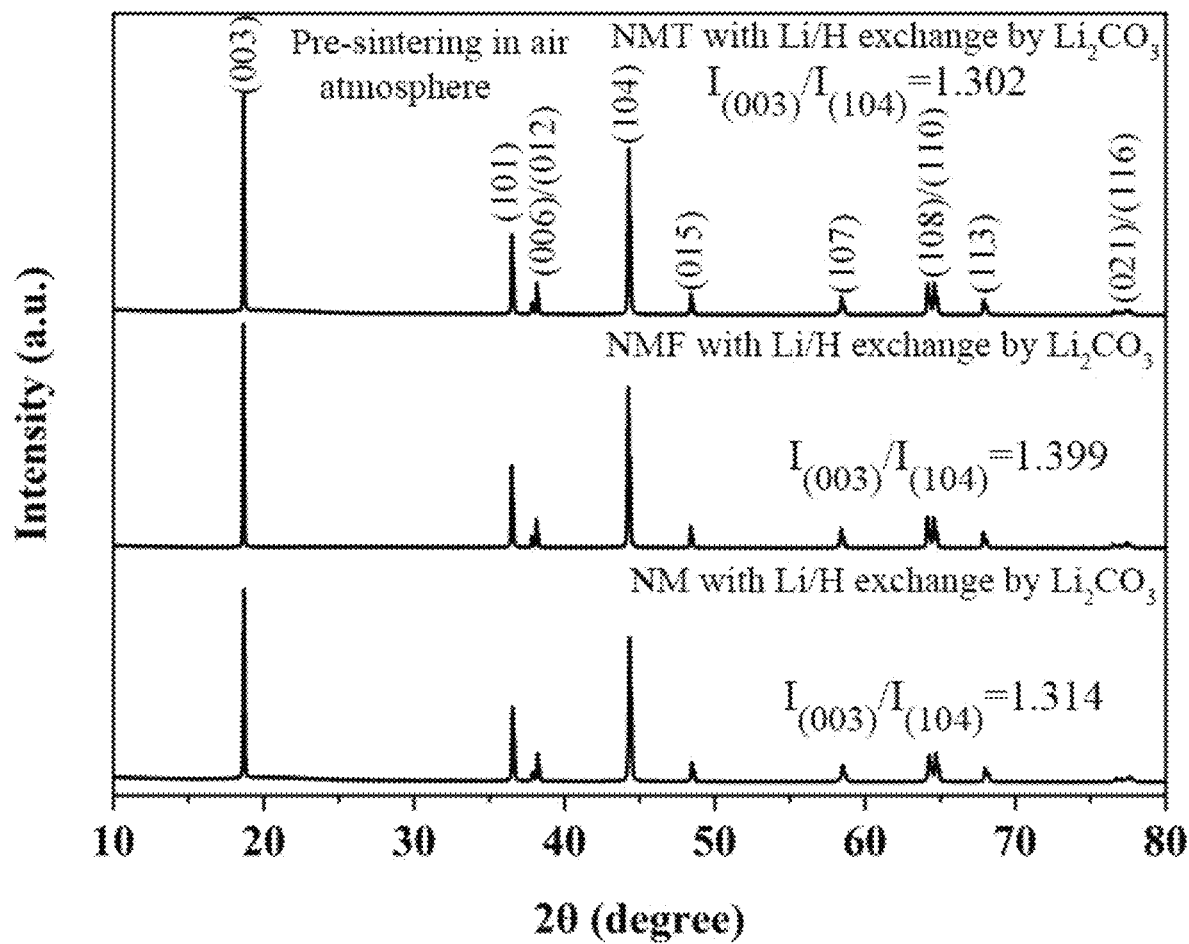
FIG. 16 shows XRD patterns of the NM, NMT and NMF cathode materials in Example 4.

FIG. 16 shows XRD patterns of the cathode materials NM, NMT and NMF obtained in Example 4. As shown in FIG. 16, by pre-sintering at low temperature in air atmosphere, sufficient $Li^+/H^+$ exchange is conducted. Even if the lithium source is replaced from LiOH to $Li_2CO_3$ with a higher melting point (to 723° C.), a cobalt-free cathode material with desirable layered structure ($I_{(003)}/I_{(104)}>1.3$) could still be obtained, which is conducive to bringing the preparation of cobalt-free cathode material by $Li^+/H^+$ exchange closer to industrial production.

Figure 17:
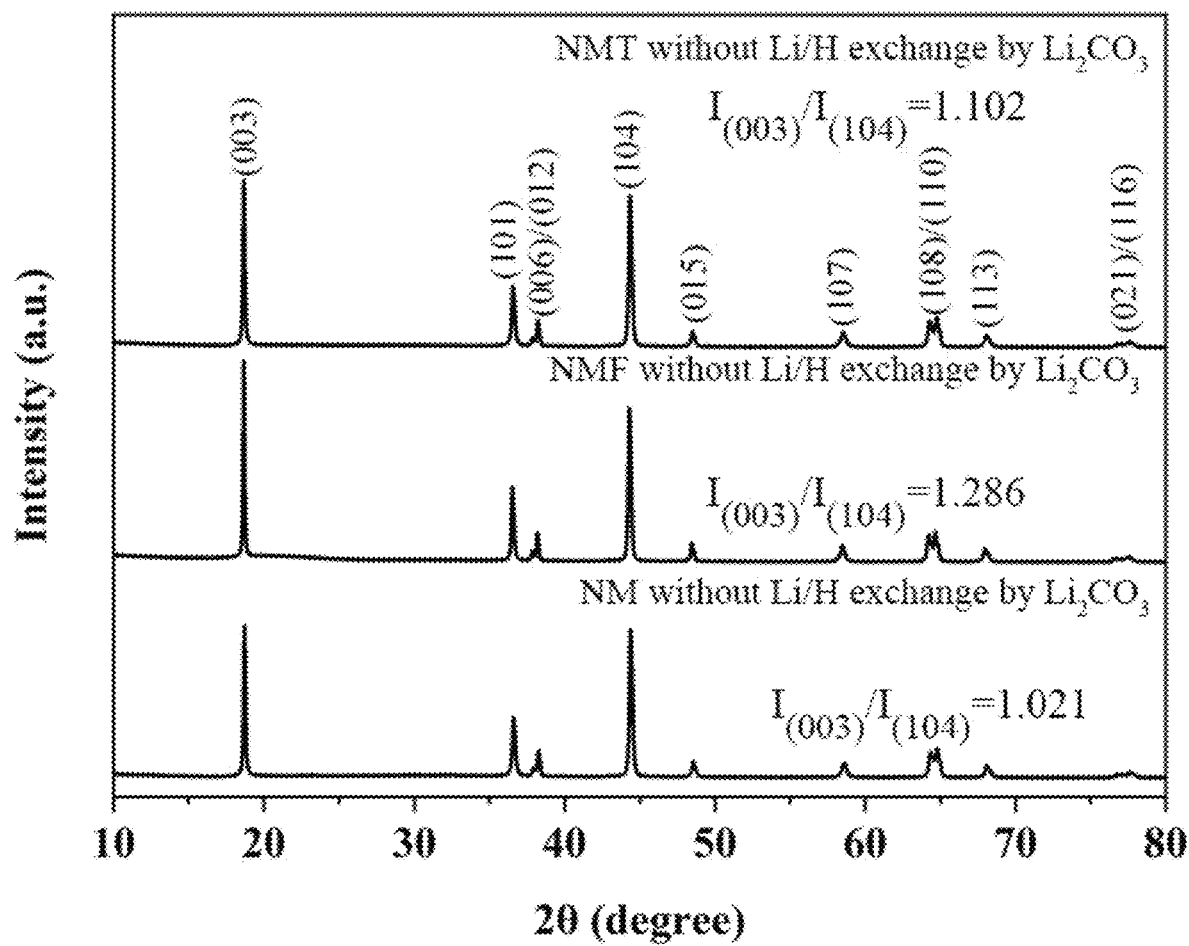
FIG. 17 shows XRD patterns of the NM, NMT and NMF cathode materials in Comparative Example 3.

FIG. 17 shows XRD patterns of the cathode materials NM, NMT and NMF obtained in Comparative Example 3. As shown in FIG. 17, compared with Example 4, the high-temperature pre-sintering makes the layered structure of the hydroxide precursor disintegrate rapidly; thus, the early full lithiation of $Li^+/H^+$ is missed. Even if an entire sintering atmosphere is high-purity oxygen, NM and NMT do not form a desirable layered structure ($I_{(003)}/I_{(104)}<1.2$).

Test Example 3

The NMF cathode materials obtained in Example 1 and Comparative Example 1 were assembled into batteries, and their electrochemical performance was tested. The batteries were assembled as follows: 1. The cathode material, PVDF, and conductive carbon black were dissolved in NMP and mixed evenly to form a cathode material slurry; 2. The cathode material slurry was evenly coated on an aluminum foil, dried, and rolled to obtain a cathode sheet (load mass (3.5-6) g/cm$^2$); 3. The cathode shell, cathode sheet, diaphragm, anode, metal gasket, and spring anode shell were assembled into a button-type battery in a glove box.

Figure 12:
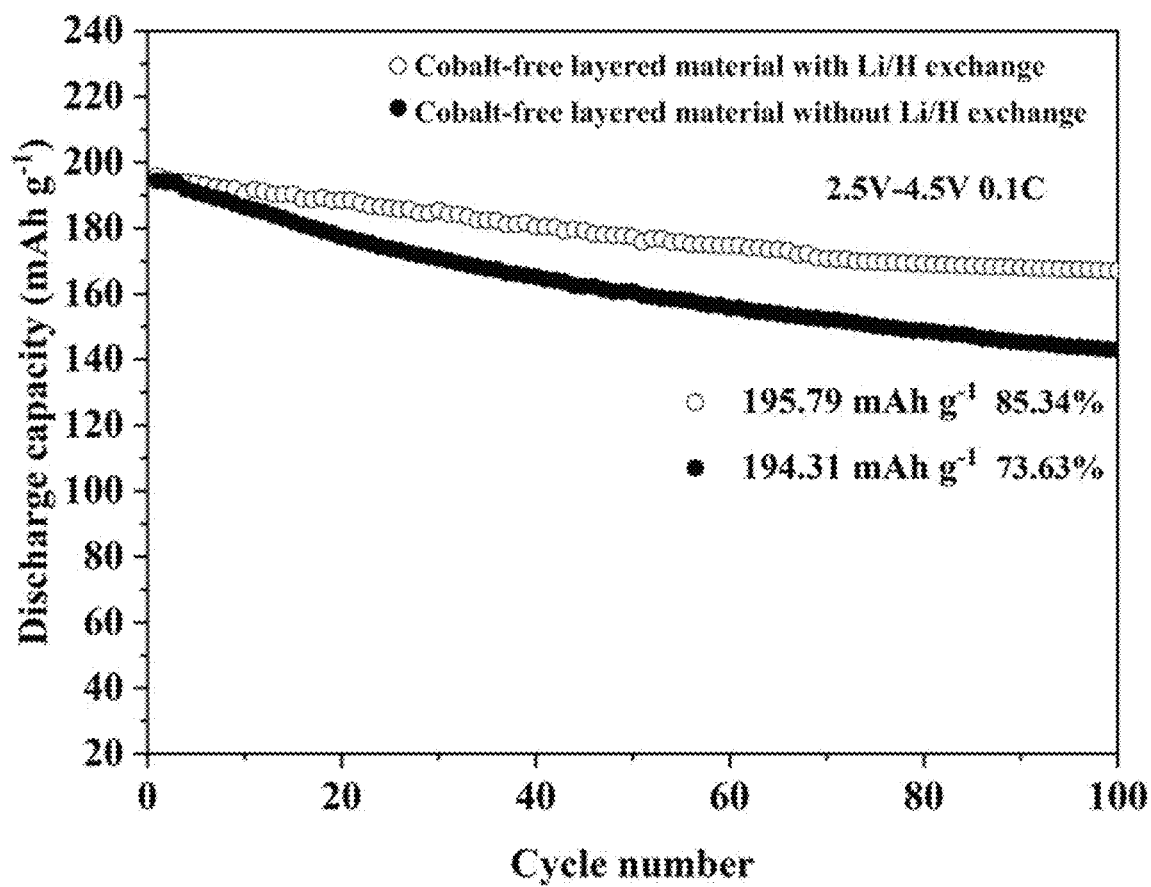
FIG. 12 shows cycle performance curves of batteries assembled with the NMF cathode materials in Example 1 and Comparative Example 1.

The obtained cycle performance curve was shown in FIG. 12, where "cobalt-free layered material with Li/H exchange" represents Example 1, and "cobalt-free layered material without Li/H exchange" represents Comparative Example 1. As shown in FIG. 12, a specific capacity of >180 mAh g$^{-1}$ is released at 0.1 C and the charge and discharge capacity retention rate is >85% after 100 cycles.

The NM, NMF, and NMT cathode materials obtained in Example 4 were assembled into batteries, and their electrochemical performance was tested. The batteries were assembled as follows: 1. The cathode material, PVDF, and conductive carbon black were dissolved in NMP and mixed evenly to form a cathode material slurry; 2. The cathode material slurry was evenly coated on an aluminum foil, dried, and rolled to obtain a cathode sheet (load mass (3.5-6) g/cm$^2$); 3. The cathode shell, cathode sheet, diaphragm, anode, metal gasket, and spring anode shell were assembled into a button-type battery in a glove box.

Figure 18:
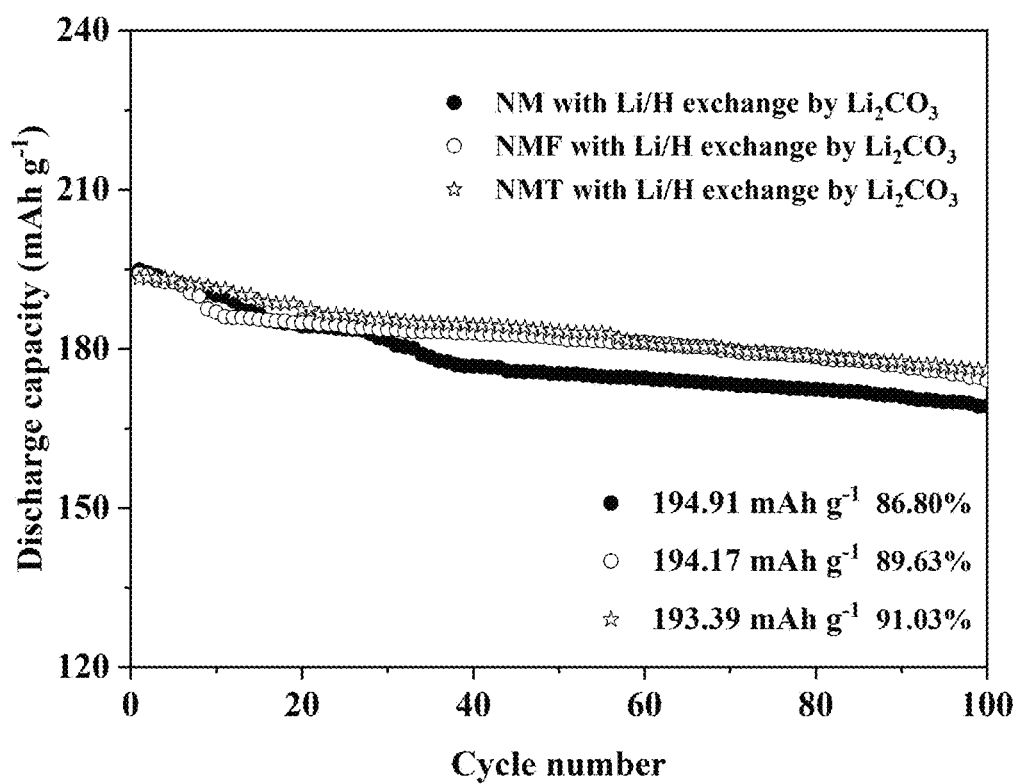
FIG. 18 shows a cycle performance curve of battery assembled with the cathode material in Example 4.

The obtained cycle performance curve is shown in FIG. 18. From FIG. 18, it can be seen that, NM, NMF, and NMT prepared by replacing the lithium source with $Li_2CO_3$ by Li/H exchange at a crystallization temperature of 810° C. all can release a first-week discharge capacity of >190 mAh g$^{-1}$ at 0.1 C, and a charge and discharge capacity retention rate is >86% after 100 cycles. The first-week discharge specific capacities of NMF and NMT are slightly lower than those of NM, but the capacity retention rates are significantly improved.

Although the present disclosure is described in detail in conjunction with the foregoing examples, they are only a part of, not all of, the examples of the present disclosure. Other examples can be obtained based on these examples without creative efforts, and all of these examples shall fall within the scope of the present disclosure.

What is claimed is:

1. A method for preparing a cobalt-free layered cathode material by Li+/H+ exchange, comprising the following steps:
   adding a metal sulfate solution, a precipitant solution, and a complexing agent solution dropwise into an aqueous ammonia solution to obtain a mixed solution, and subjecting the mixed solution to precipitation complexation to obtain a precursor; and
   mixing the precursor with a lithium source to obtain a mixture, and subjecting the mixture to a first sintering and a second sintering in sequence to obtain the cobalt-free layered cathode material, a temperature for the first sintering being less than a temperature for the second sintering, wherein metal sulfates in the metal sulfate solution comprise at least two selected from the group consisting of non-cobalt transition metal sulfates;

the first sintering is conducted at a temperature of 150° C. to 250° C. for 6 h to 10 h; and the first sintering is conducted in an oxygen atmosphere, an air atmosphere, or a vacuum atmosphere;

the second sintering is conducted at a temperature of 810° C. to 850° C. for 12 h to 20 h; and the second sintering is conducted in an oxygen atmosphere;

a precipitant in the precipitant solution comprises one selected from group consisting of sodium hydroxide and potassium hydroxide; and a complexing agent in the complexing agent solution comprises ammonium hydroxide, and the complexing agent solution has a concentration of 4 mol/L to 10 mol/L.

2. The method of claim 1, wherein the metal sulfates comprise one selected from the group consisting of a mixed salt of nickel sulfate and manganese sulfate, a mixed salt of the nickel sulfate, the manganese sulfate, and ferrous sulfate, and a mixed salt of the nickel sulfate, the manganese sulfate, and titanium sulfate.

3. The method of claim 2, wherein in the mixed salt of the nickel sulfate and the manganese sulfate, a molar ratio of $Ni^{2+}$ to $Mn^{2+}$ is in a range of 8-9.5:0.5-2;

in the mixed salt of the nickel sulfate, the manganese sulfate, and the ferrous sulfate, a molar ratio of $Ni^{2+}$, $Mn^{2+}$, and $Fe^{2+}$ is in a range of 8-9.5:0.45-1.95:0.05-0.5; and in the mixed salt of the nickel sulfate, the manganese sulfate, and the titanium sulfate, a molar ratio of $Ni^{2+}$, $Mn^{2+}$, and $Ti^{2+}$ is in a range of 8-9.5:0.45-1.95:0.05-0.5.

4. The method of claim 1, wherein the metal sulfate solution has a concentration of 1.8 mol/L to 2 mol/L;

the precipitant solution has a concentration of 4 mol/L to 6 mol/L;

the aqueous ammonia solution has a concentration of 0.5 mol/L to 2 mol/L; and a volume ratio of the metal sulfate solution, the precipitant solution, the complexing agent solution, and the aqueous ammonia solution is in a range of 100-300:100-300:50-200:2590-2700.

5. The method of claim 1, wherein the metal sulfate solution is dropwise added at a speed of 0.4 mL/min to 0.8 mL/min; the precipitant solution is dropwise added at a speed of 0.4 mL/min to 0.8 mL/min; and the complexing agent solution is dropwise added at a speed of 0.2 mL/min to 0.4 mL/min.

6. The method of claim 1, wherein the precipitation complexation is conducted at a temperature of 50° C. to 60° C. for 20 h to 60 h.

7. The method of claim 1, wherein a molar ratio of the precursor to the lithium source is in a range of 1:1.05-1.2.

8. The method of claim 4, wherein the metal sulfate solution is dropwise added at a speed of 0.4 mL/min to 0.8 mL/min; the precipitant solution is dropwise added at a speed of 0.4 mL/min to 0.8 mL/min; and the complexing agent solution is dropwise added at a speed of 0.2 mL/min to 0.4 mL/min.

* * * * *